United States Patent
Matsubara et al.

(10) Patent No.: US 9,404,207 B2
(45) Date of Patent: Aug. 2, 2016

(54) MELT-BLOWN NONWOVEN FABRIC, AND PRODUCTION PROCESS AND APPARATUS FOR THE SAME

(71) Applicant: Mitsui Chemicals, Inc., Minato-ku, Tokyo (JP)

(72) Inventors: Akio Matsubara, Ichihara (JP); Shingo Kajiyama, Ichihara (JP); Kenichi Suzuki, Ichihara (JP); Hirohisa Shiode, Yokohama (JP); Takayuki Kubo, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/921,756

(22) Filed: Oct. 23, 2015

(65) Prior Publication Data
US 2016/0040335 A1    Feb. 11, 2016

Related U.S. Application Data

(62) Division of application No. 13/991,863, filed as application No. PCT/JP2011/078082 on Dec. 5, 2011.

(30) Foreign Application Priority Data

Dec. 6, 2010 (JP) ................ 2010-272002

(51) Int. Cl.
*D04H 1/4291* (2012.01)
*D04H 1/4391* (2012.01)
(Continued)

(52) U.S. Cl.
CPC ............ *D04H 1/4391* (2013.01); *B01D 39/163* (2013.01); *B32B 5/022* (2013.01);
(Continued)

(58) Field of Classification Search
None
See application file for complete search history.

(56) References Cited

U.S. PATENT DOCUMENTS 5,080,569 A    1/1992    Gubernick et al.
5,098,636 A    3/1992    Balk
(Continued)

FOREIGN PATENT DOCUMENTS

CN    1914365    2/2007
CN    101065527 A    10/2007
(Continued)

OTHER PUBLICATIONS

Extended European Search Report issued in corresponding European Application No. 11847511.0 on Dec. 19, 2014 (7 pages).
(Continued)

*Primary Examiner* — Patrick Ryan
*Assistant Examiner* — Wyatt McConnell
(74) *Attorney, Agent, or Firm* — Buchanan, Ingersoll & Rooney PC

(57) ABSTRACT

It is an object of the present invention to provide a stable production process for a melt-blown nonwoven fabric comprising thin fibers and having extremely few thick fibers [number of fusion-bonded fibers] formed by fusion bonding of thermoplastic resin fibers to one another, and an apparatus for the same. The present invention relates to a melt-blown nonwoven fabric comprising polyolefin fibers and having (i) a mean fiber diameter of not more than 2.0 μm, (ii) a fiber diameter distribution CV value of not more than 60%, and (iii) 15 or less fusion-bonded fibers based on 100 fibers; a production process for a melt-blown nonwoven fabric characterized by feeding cooling air of not higher than 30° C. from both side surfaces of outlets of slits 31 from which high-temperature high-velocity air is gushed out and thereby cooling the spun molten resin; and a production apparatus for the same.

10 Claims, 4 Drawing Sheets

(51) Int. Cl.

| | | |
|---|---|---|
| *D01D 4/02* | (2006.01) | |
| *D01D 5/088* | (2006.01) | |
| *D01D 5/098* | (2006.01) | |
| *D04H 1/56* | (2006.01) | |
| *D04H 3/16* | (2006.01) | |
| *B01D 39/16* | (2006.01) | |
| *D04H 1/544* | (2012.01) | |
| *B32B 5/02* | (2006.01) | |
| *B32B 5/26* | (2006.01) | |
| *H01M 2/16* | (2006.01) | |
| *D04H 1/54* | (2012.01) | |

(52) U.S. Cl.
CPC ............... *B32B 5/26* (2013.01); *D01D 4/025* (2013.01); *D01D 5/088* (2013.01); *D01D 5/0985* (2013.01); *D04H 1/544* (2013.01); *D04H 1/5405* (2013.01); *D04H 1/56* (2013.01); *D04H 1/565* (2013.01); *D04H 3/16* (2013.01); *H01M 2/162* (2013.01); *B32B 2262/0253* (2013.01); *Y10T 428/24942* (2015.01); *Y10T 442/626* (2015.04)

(56) References Cited

U.S. PATENT DOCUMENTS

| | | | | |
|---|---|---|---|---|
| 5,811,178 | A * | 9/1998 | Adam | D01D 4/025 210/502.1 |
| 6,858,297 | B1 | 2/2005 | Shah et al. | |
| 9,200,392 | B2 * | 12/2015 | Matsubara | D01D 4/025 |
| 2001/0026815 | A1 | 10/2001 | Suetomi | |
| 2006/0061006 | A1 | 3/2006 | Frey et al. | |
| 2006/0261525 | A1 | 11/2006 | Breister et al. | |
| 2007/0134478 | A1 | 6/2007 | Haberer et al. | |
| 2008/0014819 | A1 | 1/2008 | Suzuki et al. | |
| 2009/0061185 | A1 | 3/2009 | Hisamoto | |
| 2010/0285101 | A1 | 11/2010 | Moore et al. | |

FOREIGN PATENT DOCUMENTS

| | | |
|---|---|---|
| CN | 101946033 A | 1/2011 |
| JP | 54-103466 A | 8/1979 |
| JP | 62-90361 A | 4/1987 |
| JP | 3-174008 A | 7/1991 |
| JP | 04-091267 A | 3/1992 |
| JP | 04-163353 A | 6/1992 |
| JP | 4-263607 A | 9/1992 |
| JP | 05-15717 A | 1/1993 |
| JP | 05-295645 A | 11/1993 |
| JP | 7-26463 A | 1/1995 |
| JP | 09-170111 A | 6/1997 |
| JP | 11-200135 A | 7/1999 |
| JP | 2000-336517 A | 12/2000 |
| JP | 2001-143682 A | 5/2001 |
| JP | 2002-371427 A | 12/2002 |
| JP | 2003-003320 A | 1/2003 |
| JP | 2006-083511 A | 3/2006 |
| JP | 2007-531831 A | 11/2007 |
| JP | 2008-038269 A | 2/2008 |
| JP | 2008-542556 A | 11/2008 |
| WO | WO 2005/093138 A1 | 10/2005 |
| WO | WO 2007/088828 A1 | 8/2007 |

OTHER PUBLICATIONS

Office Action issued on Apr. 28, 2015, by the Japanese Intellectual Property Office in corresponding Japanese Patent Application No. 2012-547846 (2 pages).

Office Action issued on Aug. 5, 2015, by the The State Intellectual Property Office of the People's Republic of China in corresponding Chinese Patent Application No. 201180056953.4 (11 pages).

* cited by examiner 1 4

MELT-BLOWN NONWOVEN FABRIC, AND PRODUCTION PROCESS AND APPARATUS FOR THE SAME

TECHNICAL FIELD

The present invention relates to a melt-blown nonwoven fabric which comprises ultrafine fibers, is flexible, has excellent uniformity and is favorably used for filters, sanitary materials and battery separators, and a production process and an apparatus for the same.

BACKGROUND ART

Since melt-blown nonwoven fabrics can be composed of ultrafine fibers as compared with spun bonded nonwoven fabrics, they have excellent flexibility and are used not only for filters but also for sanitary materials, clothes, packaging materials, battery separators, etc. by using them singly or laminating them onto others such as nonwoven fabrics.

For producing the melt-blown nonwoven fabrics, a molten resin is subjected to drawing and thinning by means of a fluid of high temperature and high velocity, and therefore, ball-like substances (shots) and fly-like substances are liable to be formed, and various methods to solve them have been proposed.

For example, there have been proposed various methods, such as a method in which a shape of a die nose tip of a melt-blowing die, the distance between a die nose tip and a lip plate tip, etc. are set in the specific ranges (patent literature 1: Japanese Patent Laid-Open Publication No. 1979-103466), a method in which a die having a lip plate tip width (interval between air knives) of 0.4 to 0.8 mm is used (patent literature 2: Japanese Patent Laid-Open Publication No. 1992-91267), a method in which a melt-blown nonwoven fabric is produced under the conditions of a nozzle orifice diameter of 0.1 to 0.5 mm and a discharge rate per single hole of 0.05 to 0.8 g/min, preferably 0.1 to 0.5 g/min (patent literature 3: Japanese Patent Laid-Open Publication No. 1993-295645), a method in which the spacing (air gap) of a drawing fluid flow path, the distance between a die nose tip and a lip plate tip, and the ratio between them are set in the specific ranges (patent literature 4: Japanese Patent Laid-Open Publication No. 2009-200135) and a method in which the mean fiber diameter is set in the range of 0.1 to 5.0 μm (patent literature 5: Japanese Patent Laid-Open Publication No. 1992-163353).

As a method to obtain a melt-blown nonwoven fabric of thin fibers, a method in which secondary blowing air having a temperature of not lower than 50° C. is blown against spun filaments transversely to delay cooling and solidification of the spun filaments, whereby thinning is carried out (patent literature 6: Japanese Patent Laid-Open Publication No. 2006-83511) has been proposed.

In the existing circumstances, melt-blown nonwoven fabrics having a little narrower fiber diameter distribution can be produced by the above methods proposed, but formation of thick fibers each having a fiber diameter of twice or more the mean fiber diameter caused by fusion bonding of fibers during the melt extrusion cannot be completely prevented.

In the method in which the mean fiber diameter is set in the range of 0.1 to 5.0 μm (patent literature 5: Japanese Patent Laid-Open Publication No. 1992-163353), a melt-blown nonwoven fabric wherein the coefficient of variation (CV) of fiber diameter was not more than 30% was obtained, but when the melt-blown nonwoven fabric obtained by the method described in the patent literature 5 was evaluated by the evaluation method described in the examples of the present invention, the coefficient of variation (CV) of fiber diameter was 90%.

CITATION LIST

Patent Literature

Patent literature 1: Japanese Patent Laid-Open Publication No. 1979-103466
Patent literature 2: Japanese Patent Laid-Open Publication No. 1992-91267
Patent literature 3: Japanese Patent Laid-Open Publication No. 1993-295645
Patent literature 4: Japanese Patent Laid-Open Publication No. 1999-200135
Patent literature 5: Japanese Patent Laid-Open Publication No. 1992-163353
Patent literature 6: Japanese Patent Laid-Open Publication No. 2006-83511

SUMMARY OF INVENTION

Technical Problem

In the light of such actual circumstances in the past as above, it is an object of the present invention to obtain a process for stably producing a melt-blown nonwoven fabric comprising thin fibers and having extremely few thick fibers [number of fusion-bonded fibers] formed by fusion bonding of thermoplastic resin fibers to one another, a production apparatus for the melt-blown nonwoven fabric, and the melt-blown nonwoven fabric.

Solution to Problem

The present invention relates to:

a melt-blown nonwoven fabric comprising polyolefin fibers and having:
 (i) a mean fiber diameter of not more than 2.0 μm,
 (ii) a fiber diameter distribution CV value of not more than 60%, and
 (iii) 15 or less fusion-bonded fibers based on 100 fibers; and a production process for a melt-blown nonwoven fabric, comprising spinning out a molten thermoplastic resin through a nozzle having a large number of small holes lined up, said molten resin having been forcedly fed to a melt-blowing die, and accumulating fibers on a moving collection plate, said fibers being obtained by drawing and thinning the molten resin by high-temperature high-velocity air gushed out from slits provided so as to interpose a line of the small holes therebetween, wherein:

a cooling fluid of not higher than 30° C., preferably cooling air, is fed from both side surfaces of outlets of the slits from which the high-temperature high-velocity air is gushed out, to cool the spun thermoplastic resin fibers; and a production apparatus for a melt-blown nonwoven fabric, in which an attachment to introduce a cooling fluid for cooling the spun thermoplastic resin fibers has been removably mounted on the tip of the melt-blowing die.

Advantageous Effects of Invention

The melt-blown nonwoven fabric of the present invention contains extremely few thick fibers formed by fusion bonding of fibers to one another, and therefore, for example, a filter using the melt-blown nonwoven fabric has a feature that the fine particle collection efficiency is extremely high.

According to the production process and the apparatus for a melt-blown nonwoven fabric of the present invention, a melt-blown nonwoven fabric comprising thin fibers and very rarely suffering fusion bonding of thin fibers can be stably produced.

The production apparatus of the present invention has a simple and compact structure and can be made up without largely changing design of a general purpose production apparatus.

DESCRIPTION OF EMBODIMENTS

<Thermoplastic Resin>

Figure 1:
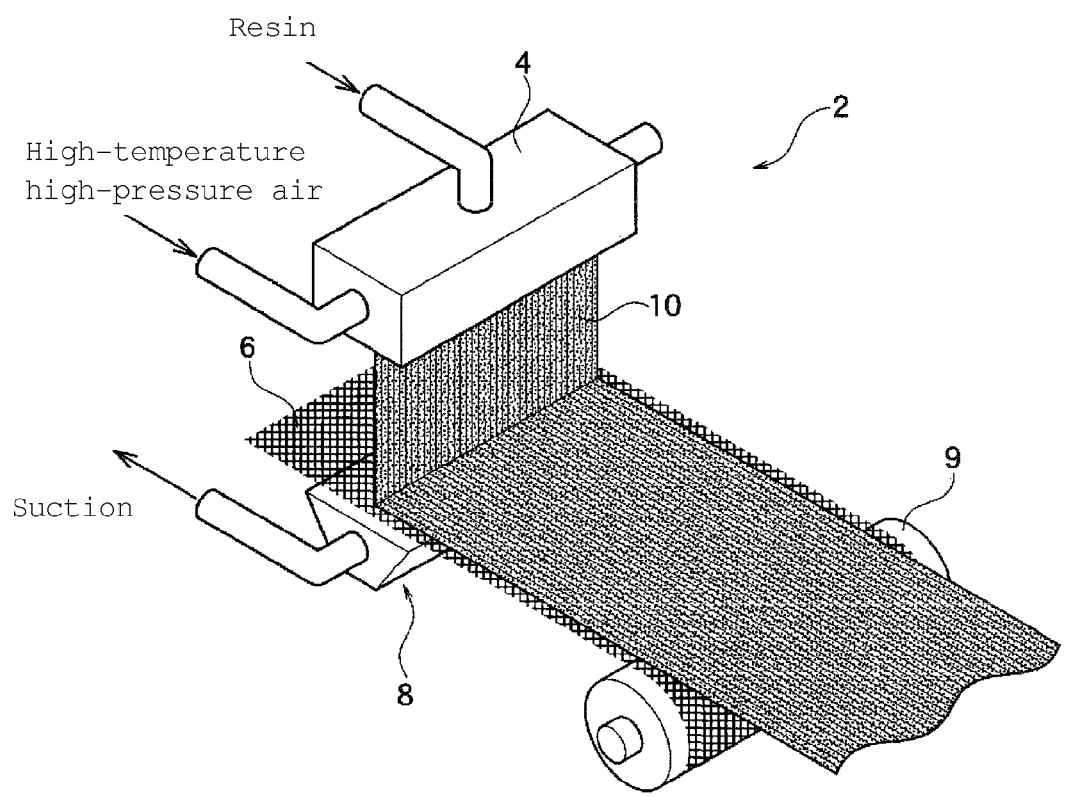
FIG. 1 is a schematic perspective view of a conventional production apparatus for a melt-blown nonwoven fabric, which has the same basic constitution as that of the production apparatus for a melt-blown nonwoven fabric of the present invention.

As the thermoplastic resins that become raw materials of ultrafine fibers for forming the melt-blown nonwoven fabric of the present invention, a variety of publicly known thermoplastic resins can be used.

Examples of the thermoplastic resins include polyolefins, which are homopolymers or copolymers of α-olefins such as ethylene, propylene, 1-butene, 1-hexene, 4-methyl-1-pentene and 1-octene, e.g., high-pressure low-density polyethylene, linear low-density polyethylene (so-called LLDPE), high-density polyethylene, polypropylene (propylene homopolymer), propylene random copolymer, poly-1-butene, poly-4-methyl-1-pentene, ethylene/propylene random copolymer, ethylene/1-butene random copolymer and propylene/1-butene random copolymer; polyesters (polyethylene terephthalate, polybutylene terephthalate, polyethylene naphthalate, etc.), polyamides (nylon 6, nylon 66, polymetaxylene adipamide, etc.), polyvinyl chloride, polyimide, ethylene/vinyl acetate copolymer, polyacrylonitrile, polycarbonate, polystyrene, ionomer, and mixtures thereof. Of these, high-pressure low-density polyethylene, linear low-density polyethylene (so-called LLDPE), high-density polyethylene, propylene-based polymers, such as polypropylene and propylene random copolymer, polyethylene terephthalate, polyamides, etc. are preferable.

<Propylene-Based Polymer>

Of the above thermoplastic resins, the propylene-based polymer is preferable because the resulting melt-blown nonwoven fabric has excellent chemical resistance.

The propylene-based polymer is a homopolymer of propylene or a copolymer of propylene and an extremely small amount of one or more α-olefins having 2 or more carbon atoms, preferably 2 to 8 carbon atoms, such as ethylene, 1-butene, 1-pentene, 1-hexene, 1-octene and 4-methyl-1-pentene, said homopolymer and copolymer having a melting point (Tm) of not lower than 155° C., preferably 157 to 165° C., and preferable is a propylene homopolymer.

The melt flow rate (MFR: ASTM D 1238, 230° C., load of 2160 g) of the propylene-based polymer is not specifically restricted as far as the propylene-based polymer can be subjected to melt spinning, but the melt flow rate is usually in the range of 1 to 1000 g/10 min, preferably 5 to 500 g/10 min, more preferably 10 to 100 g/10 min.

<Production Process for Melt-Blown Nonwoven Fabric>

The production process for a melt-blown nonwoven fabric of the present invention is a production process for a melt-blown nonwoven fabric, comprising spinning out a molten thermoplastic resin (molten resin) through a nozzle having a large number of small holes lined up, said molten resin having been forcedly fed to a melt-blowing die, and accumulating fibers on a moving collection plate, said fibers being obtained by drawing and thinning the molten resin by high-temperature high-velocity air gushed out from slits provided so as to interpose a line of the small holes therebetween, wherein a cooling fluid of not higher than 30° C., preferably 5 to 25° C., more preferably 5 to 20° C., is fed from both side surfaces of outlets of the slits from which the high-temperature high-velocity air is gushed out, to cool the spun thermoplastic resin fibers.

Examples of the cooling fluids include water and air, but if water is used, there is a fear that moisture remains in the nonwoven fabric to thereby mildew the nonwoven fabric. Moreover, a minute amount of a metal component derived from water adheres to the fibers, and therefore, such a fabric is undesirable as a nonwoven fabric for microfilter used in the semiconductor industry or a nonwoven fabric for separator.

On this account, the cooling fluid is preferably cooling air.

According to the production process for a melt-blown nonwoven fabric of the present invention, the temperature of the high-temperature high-velocity air flow is lowered to not higher than a given temperature by being joined with a cooling fluid when the spun thermoplastic resin fibers are drawn and thinned by the high-temperature high-velocity air, whereby fusion bonding of the fibers to one another can be prevented, and thereby, thick fibers [number of fusion-bonded fibers] formed by fusion bonding of the fibers to one another can be decreased.

<Production Apparatus for Melt-Blown Nonwoven Fabric>

The production apparatus for a melt-blown nonwoven fabric of the present invention is a production apparatus for a melt-blown nonwoven fabric, which performs spinning of a molten thermoplastic resin through a nozzle having a large number of small holes lined up, said molten resin having been forcedly fed to a melt-blowing die, and accumulating of fibers on a moving collection plate, said fibers being obtained by drawing and thinning the molten resin by high-temperature high-velocity air gushed out from slits provided so as to interpose a line of the small holes therebetween, wherein an attachment to introduce a cooling fluid, preferably cooling air, for cooling the spun thermoplastic resin fibers has been removably mounted on the tip of the melt-blowing die.

Here, the attachment has been preferably mounted on the tip of the melt-blowing die without any space.

The expression "without any space" means that an air passage to introduce external air is not formed.

According to such a constitution, a cooling air flow is given along the nozzle surface, and even when a cooling fluid, preferably cooling air, for cooling the fibers obtained by drawing and thinning the resin by high-temperature high-velocity air is introduced, no swirling flow occurs, and a mixture of the high-temperature high-pressure air and the cooling fluid can be led downward in order. By virtue of this, the resin fibers can be guided downward while preventing twisting or fusion bonding of the fibers.

<Production Process and Production Apparatus for Melt-Blown Nonwoven Fabric>

The production process and the production apparatus for a melt-blown nonwoven fabric using the propylene-based polymer are further described below referring to the drawings.

Figure 2:
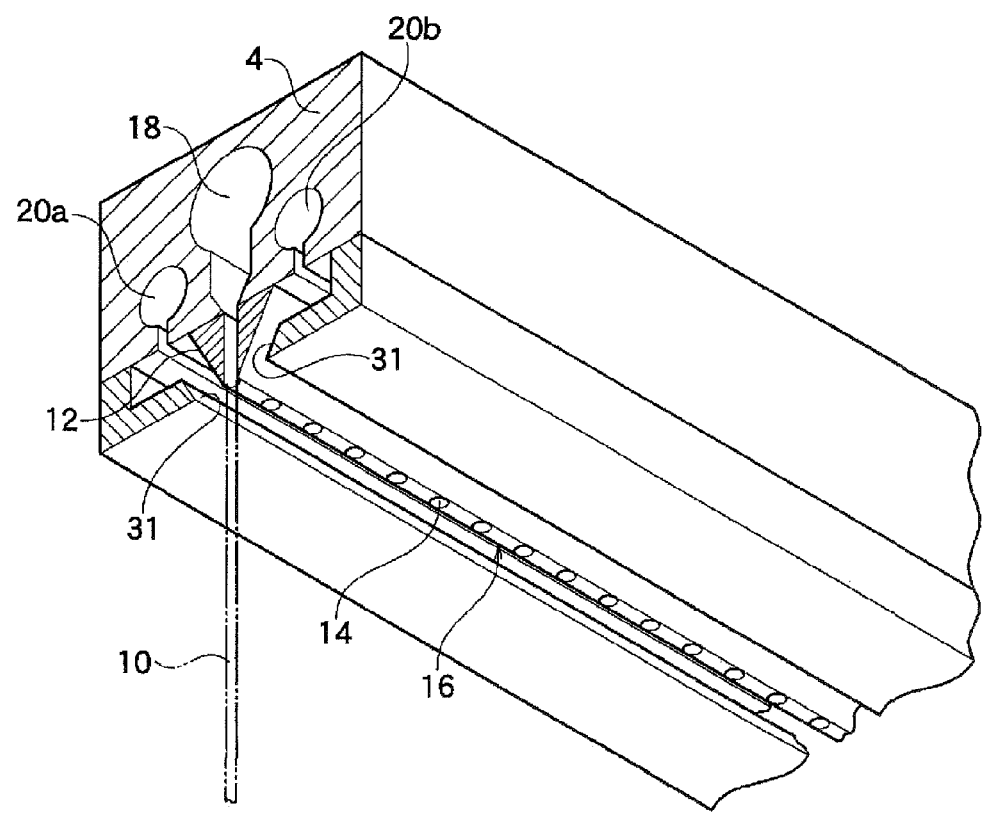
FIG. 2 is a schematic perspective view of a melt-blowing die of the production apparatus for a melt-blown nonwoven fabric shown in FIG. 1, said melt-blowing die being seen from the lower surface side.

FIG. 1 and FIG. 2 are each a schematic view showing a conventional production apparatus for a melt-blown nonwoven fabric, which has been used in the past.

In this production apparatus 2 for a melt-blown nonwoven fabric, a collection plate composed of a mesh conveyer 6 is arranged below a melt-blowing die 4, and below this mesh conveyer 6, a suction box 8 the interior of which can be sucked by a pressure reducing means (suction) is arranged.

On the lateral side of the suction box 8, a roller 9 to move (rotate) the mesh conveyer 6 is arranged, and above the downstream side thereof, a wind-up roller (not shown) to wind up the melt-blown nonwoven fabric is arranged.

As shown in FIG. 2, on the lower surface side of the melt-blowing die 4, a die nose 12 having a sectional shape of an isosceles triangle is arranged, and at the central part of this die nose 12, a nozzle 16 having plural small holes 14 disposed in a line is arranged. The molten resin having been fed into a resin passage 18 is pushed out downward from the small holes 14 of the nozzle 16. In FIG. 2, one fiber 10 pushed out is only shown. On the other hand, slits 31 and 31 are formed so that they may interpose the line of the small holes 14 of the nozzle 16 from both sides of the line, and these slits 31 and 31 constitute air passages 20a and 20b. When the molten resin is pushed out, the high-temperature high-pressure air fed through the air passages 20a and 20b is gushed out in the obliquely downward direction.

In usual, the diameter of the small hole 14 formed in the nozzle 16 is preferably 0.05 mm to 0.4 mm. If the diameter of the small hole 14 is less than 0.05 mm, the resulting fibers have non-uniform shapes from the viewpoint of processing accuracy, and the CV (%) of the fiber diameter becomes larger, so that such a diameter is undesirable. Moreover, a problem that the holes are liable to be clogged in the long-term operation because of deterioration of the polymer, etc. occurs, so that such a diameter is undesirable. On the other hand, if the diameter is larger than 0.4 mm, it becomes difficult to obtain ultrafine fibers, so that such a diameter is undesirable.

The single hole discharge rate of the molten resin is usually 0.05 g/min to 3.0 g/min, preferably 0.1 g/min to 2.0 g/min. If the discharge rate is less than 0.05 g/min, not only is the productivity lowered but also broken fiber called fly tends to occur, so that clogging of holes is liable to take place during the continuous operation. On the other hand, if the discharge rate is more than 3.0 g/min, there is a fear that sufficient thinning is not performed.

When the melt-blown nonwoven fabric is used for a sanitary material, low cost is desired from the viewpoint of properties of the manufactured article, and therefore, production at a relatively high discharge rate is required. In this case, the single hole discharge rate is usually not less than 0.2 g/min, preferably not less than 0.3 g/min. If the discharge rate is less than 0.2 g/min, there is a fear of low productivity.

Figure 5:
FIG. 5 is a view showing a distance between neighboring small holes 14.

The distance between the small holes 14 (distance between outer peripheries of the neighboring small holes, as shown in FIG. 5), though depending upon the desired fiber diameter, is usually 0.01 to 6.0 mm, preferably 0.15 to 4.0 mm. If the distance between the holes is less than the lower limit of the above range, there is a fear of occurrence of bundle-like fibers formed by fusion bonding or twisting of plural fibers. The reason is thought to be that the probability of contact of neighboring fibers with each other is increased, and the fibers are liable to be fusion-bonded or twisted and become bundle-like fibers. On the other hand, if the distance between the holes exceeds the upper limit of the above range, entanglement of the resulting fibers with one another is markedly lowered, and dimensional stability of the melt-blown nonwoven fabric is lowered, so that problems of lowering of strength of the nonwoven fabric and formation of a nappy nonwoven fabric are liable to occur.

In order to obtain a melt-blown nonwoven fabric of thin fibers, e.g., a melt-blown nonwoven fabric having a fiber diameter of 0.1 to 0.8 µm, the distance between the holes is usually in the range of 1.0 mm to 6.0 mm, preferably 1.5 mm to 4.0 mm, more preferably 2.0 mm to 3.0 mm.

When the melt-blown nonwoven fabric is used for a sanitary material, low cost is desired from the viewpoint of properties of the manufactured article, and therefore, production at a relatively high discharge rate is required, so that the amount of fibers is desired to be relatively increased. On this account, the distance between the small holes 14 is usually in the range of 0.1 mm to 2.0 mm, preferably 0.15 mm to 1.8 mm, more preferably 0.21 mm to 1.6 mm.

The air flow rate of the high-temperature high-pressure air gushed out from the slit 31 is usually in the range of 200 $Nm^3/hr/m$ to 1000 $Nm^3/hr/m$. If the air flow rate is less than 200 $Nm^3/hr/m$, thinning of the spun fibers is liable to become insufficient. On the other hand, if the air flow rate exceeds 1000 $Nm^3/hr/m$, the drawing air velocity becomes an ultrasonic flow velocity, and an unsteady state of the flow is liable to become high.

The conventional production apparatus 2 for a melt-blown nonwoven fabric roughly has such constitution as above. In such a production apparatus 2 for a melt-blown nonwoven fabric, the fibers 10 obtained by drawing and thinning the molten resin by means of the high-temperature high-velocity air, said molten resin having been spun out through the nozzle 16 together with the high-temperature high-pressure air, are bonded by means of self fusion bonding on the mesh conveyer 6, and thereafter, they are wound up in order by a nonwoven fabric wind-up roller (not shown) on the downstream side.

Figure 3:
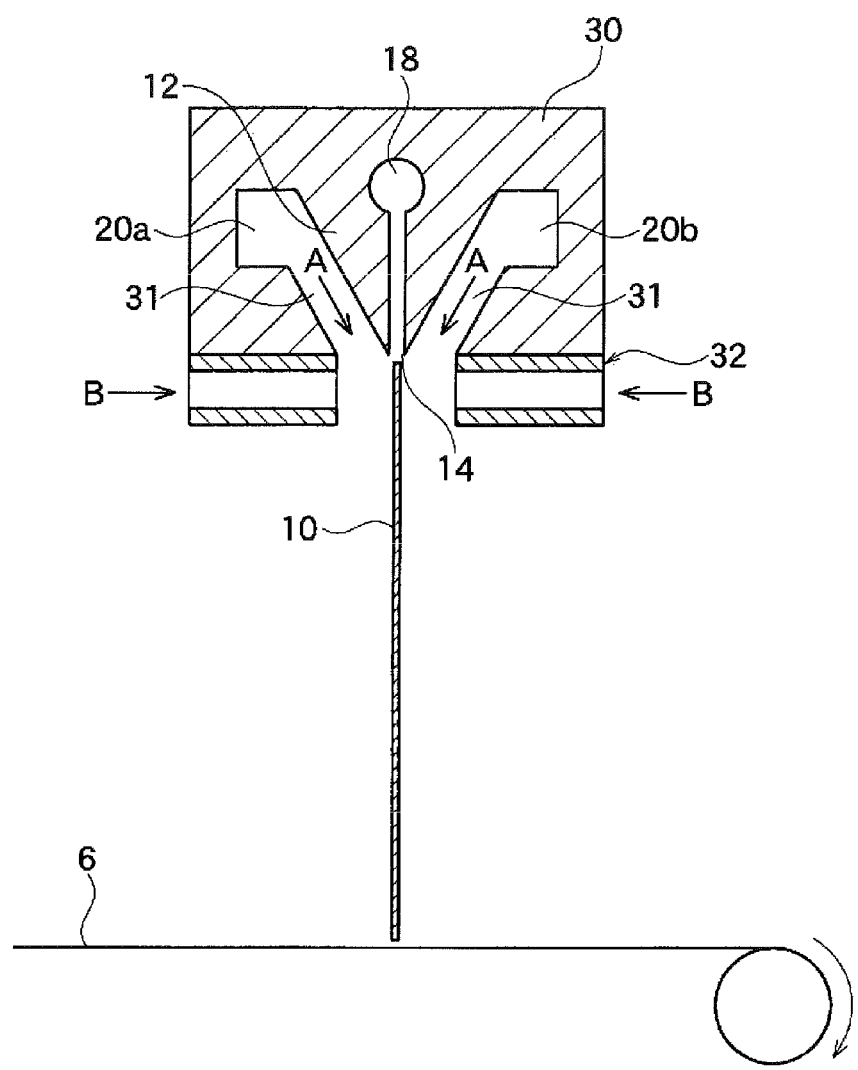
FIG. 3 is a schematic sectional view showing an essential part of a production apparatus for a melt-blown nonwoven fabric in one working example of the present invention.

In the production apparatus for a melt-blown nonwoven fabric of the present invention, an attachment 32 to introduce cooling air is newly removably mounted on the melt-blowing die 30 in addition to such general purpose constitution as above, as shown in FIG. 3.

That is to say, in the production apparatus of the present invention, the high-temperature high-pressure air, such as high-temperature high-pressure air of not lower than 280° C., is fed through the air passages 20a and 20b, and in addition, a cooling fluid of not higher than 30° C., preferably cooling air, is horizontally fed through the attachment 32. This makes it possible to produce a melt-blown nonwoven fabric comprising thin fibers and having few thick fibers formed by fusion bonding of the fibers, that is, having 15 or less fusion-bonded fibers, preferably 12 or less fusion-bonded fibers, more preferably 10 or less fusion-bonded fibers, based on 100 fibers in the present invention.

Here, it is preferable that the attachment 32 is a member separated from the melt-blowing die 30 and is removably mounted on the melt-blowing die 30.

The melt-blowing die 30 is usually heated up to about 280° C. by, for example, a heater, and therefore, it is necessary to mount the attachment 32 for feeding cooling air having a large temperature difference so that heat propagation between the attachment 32 and the melt-blowing die 30 should not occur. On that account, it is preferable to place, for example, a heat insulating material on the lower surface of the die 30, or the attachment 32 may be mounted leaving a little space between the melt-blowing die 30 and the attachment 32.

However, when a little space is left between the melt-blowing die 30 and the attachment 32 as above, it is necessary to place a shielding plate or the like between the outer end surfaces of them to thereby stop up the space between the die 30 and the attachment 32 hermetically.

Figure 4:
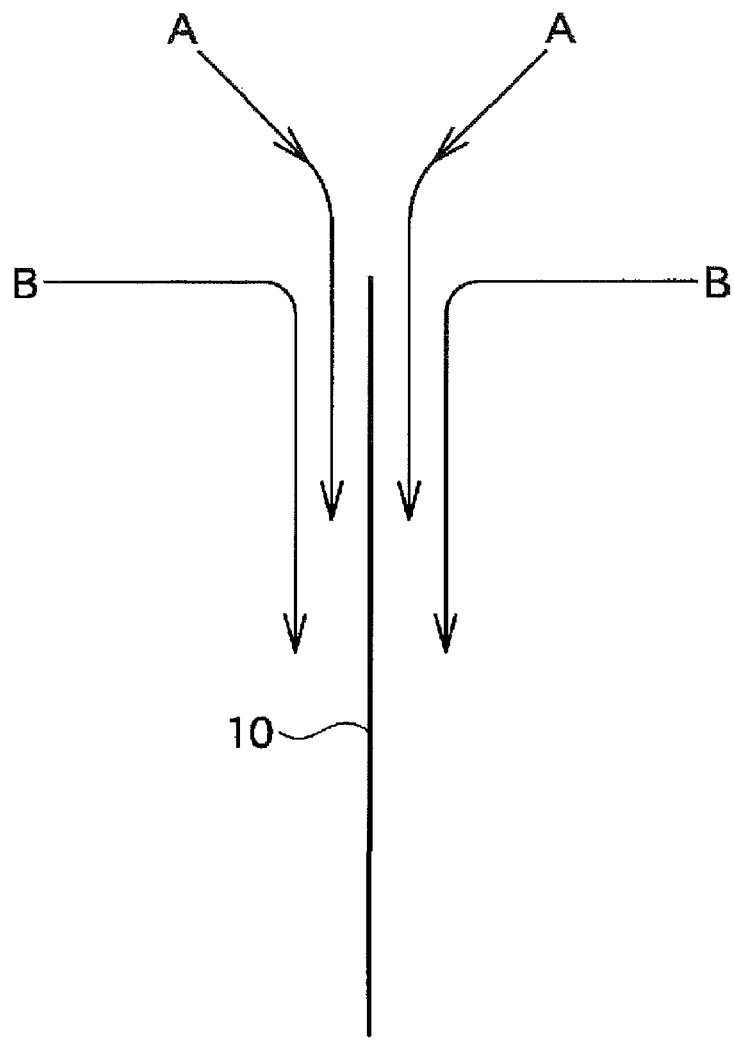
FIG. 4 is a schematic view showing a flow of air in a production apparatus for a melt-blown nonwoven fabric in one working example of the present invention.

If the attachment 32 is removably mounted on the melt-blowing die 30 in such a manner as above, the cooling air fed from the attachment 32 is not immediately mixed with the high-temperature high-pressure air that is fed through the air passages 21a and 20b as described later, but can be guided downward in the temporarily independent state along the flow of the high-temperature high-pressure air, as shown in FIG. 4.

If the melt-blowing die 30 and the attachment 32 are connected to each other without any space as above, that is, if they are connected so that an air passage to introduce external air should not be formed, any swirling flow does not occur above the attachment 32. By virtue of this, the flow of the high-temperature high-pressure air in the direction of an arrow A shown in FIG. 3 is not disturbed. Hence, spinning and stretching are performed so as to give fibers having desired fiber diameters.

In the present invention, further, when the cooling air is horizontally given in the direction of the arrow B, the high-temperature high-pressure air and the cooling air are not mixed immediately but mixed at a position a little lower than the position at which they impinge on each other, as shown in FIG. 4. Hence, the fibers 10 are not only drawn and thinned into desired fiber diameters by means of the high-temperature high-pressure air but also cooled rapidly.

According to the present invention, therefore, the fibers are cooled rapidly after the cooling air is mixed with the high-temperature air, whereby fusion bonding of the fibers to one another can be prevented as much as possible.

<Melt-Blown Nonwoven Fabric>

By the use of the production process and the production apparatus for a melt-blown nonwoven fabric of the present invention and by the use of polyolefin among the aforesaid thermoplastic resins that become raw materials, a melt-blown nonwoven fabric having the following properties can be produced.

That is to say, the melt-blown nonwoven fabric of the present invention is a melt-blown nonwoven fabric comprising polyolefin fibers and having:

(i) a mean fiber diameter of not more than 2.0 μm, (ii) a fiber diameter distribution CV value of not more than 60%, preferably not more than 50%, and (iii) 15 or less fusion-bonded fibers, preferably 12 or less fusion-bonded fibers, more preferably 10 or less fusion-bonded fibers, based on 100 fibers.

By the use of the production process and the production apparatus for a melt-blown nonwoven fabric of the present invention and by the use of a propylene-based polymer among the aforesaid thermoplastic resins that become raw materials, a melt-blown nonwoven fabric having the following properties can be produced.

That is to say, the melt-blown nonwoven fabric of the present invention is a melt-blown nonwoven fabric comprising propylene-based polymer fibers and having:

(i) a mean fiber diameter of not more than 2.0 μm, (ii) a fiber diameter distribution CV value of not more than 60%, preferably not more than 50%, and (iv) an $\alpha$ crystal fraction of less than 0.9.

When the above properties (i), (ii) and (iii) are not satisfied, or when the above properties (i), (ii) and (iv) are not satisfied, cooling of the fibers obtained by drawing and thinning is not sufficiently effected, and plural fibers are fusion-bonded or twisted to bring about many bundle-like fibers. On this account, large voids are liable to be formed in the nonwoven fabric to thereby lower functions of the nonwoven fabric, such as filtering performance and water resisting performance.

The melt-blown nonwoven fabric of the present invention is most preferably a melt-blown nonwoven fabric comprising the propylene-based polymer fibers and satisfying the properties (i), (ii), (iii) and (iv) at the same time.

(i) Mean Fiber Diameter

The mean fiber diameter is usually not more than 2.0 μm. In the use for sanitary materials, the mean fiber diameter is not more than 2 μm, preferably not more than 1.8 μm. In the use for filters, the mean fiber diameter is not more than 0.8 μm, preferably 0.3 to 0.6 μm.

The $\alpha$ crystal fraction in the propylene-based polymer fibers obtained by the melt-blowing process is less than 0.9, preferably less than 0.7, more preferably less than 0.6. If the $\alpha$ crystal fraction exceeds 0.9, cooling of the fibers obtained by drawing and thinning is not sufficiently effected, and plural fibers are fusion-bonded or twisted to bring about many bundle-like fibers. On this account, large voids are liable to be formed in the nonwoven fabric to thereby lower functions of the nonwoven fabric, such as filtering performance and water resisting performance. It is most preferable that the melt-blown nonwoven fabric of the present invention composed of the propylene-based polymer fibers has a crystallinity of less than 40% in addition to the $\alpha$ crystal fraction of the above range.

The $\alpha$ crystal fraction in the propylene-based polymer fibers, that is, crystalline property, is described below in detail. Evaluation of crystalline property and orientation property by the use of X rays has been introduced by many publicly known literatures in the past, and at present, this is an evaluation method established as an analysis of polymer structures. This evaluation method is described in, for example, the Society of Polymer Science, Japan, ed., "Kobunshi Jikken-gaku Koza Dai-2-kan (Polymer Experiment Course, Vol. 2)", Kyoritsu Shuppan Co., Ltd. (1958), Isamu Nitta ed., "X-sen Kessho-gaku, Jo (X-ray Crysatallography, the first volume)", Maruzen Co., Ltd. (1959), Kakudo, Kawai and Saito ed., "Kobunshi no Kozo to Bussei (Structures and Properties of Polymers)", Yukichi Kure and Kiichiro Kubo: "Koka", 39, 929 (1939), etc. Evaluation of crystalline property in the present invention was carried out in accordance with the evaluation method of these publicly known literatures, and specifically, the crystalline property was evaluated in the following manner. The total scattering intensity curve of X rays in the wide angle X-ray diffraction profile was separated into a crystalline region due to scattering contribution and a non-crystalline region due to scattering contribution, and the ratio of each area to the total area was evaluated as a crystalline property index value. For example, it is known that a propylene-based polymer (polypropylene) has diffraction peaks of crystalline property in the vicinities of 2θ: 14°, 17°, 18°, 21° and 22°; polyethylene has diffraction peaks of crystalline property in the vicinities of 2θ: 21°, 24° and 30°; polylactic acid has diffraction peaks of crystalline property in the vicinities of 2θ: 16° and 18°; polyethylene terephthalate has diffraction peaks of crystalline property in the vicinities of 2θ: 17°, 18° and 26°; polytrimethylene terephthlate has diffraction peaks of crystalline property in the vicinities of 2θ: 9°, 15°, 17°, 19°, 23°, 25°, 28° and 29°; and polybutylene terephthalate has diffraction peaks of crystalline property in the vicinities of 2θ: 9°, 16°, 17°, 20°, 23°, 25° and 29°. The evaluation is carried out by regarding the region to which these crystalline property diffraction peaks contribute, as the crystalline region, and separating this region from the non-crystalline region.

In the propylene-based polymer, two kinds of crystals of α crystal and smectic crystal coexist in some cases, and from the characteristic relationship between their peak intensities, the α crystal and the smectic crystal are separated, and thereby, the α crystal fraction is evaluated. By feeding the cooling fluid (preferably cooling air) having a temperature of not higher than 30° C., preferably 5 to 25° C., and thereby cooling the spun molten resin, the α crystal fraction of the nonwoven fabric of the present invention can be set in the above range.

On the melt-blown nonwoven fabric of the present invention, other layers can be laminated according to various use purposes.

Specific examples of other layers include layers of knitted fabrics, woven fabrics, nonwoven fabrics and films. When the melt-blown nonwoven fabric of the present invention and other layers are laminated (bonded) on each other, a variety of publicly known methods, e.g., thermal fusion bonding methods, such as heat embossing method and ultrasonic fusion bonding method, mechanical entangling methods, such as needle punch method and water jet method, methods using adhesives such as hot melt adhesives and urethane-based adhesives, and extrusion laminating, can be adopted.

Examples of the nonwoven fabrics laminated on the melt-blown nonwoven fabric of the present invention include a variety of publicly known fabrics, such as spun bonded nonwoven fabric, wet type nonwoven fabric, dry type nonwoven fabric, dry type pulp nonwoven fabric, flash spun nonwoven fabric and spread-fiber nonwoven fabric.

<Filter>

The filter of the present invention is a filter containing a layer composed of the melt-blown nonwoven fabric, and has a 0.5 mm diameter fine particle collection efficiency of not less than 99% in the case of a basis weight of 90 g/cm².

The filter of the present invention may be a filter of a single layer of the melt-blown nonwoven fabric or may be a filter of a laminate structure of two or more layers. Further, the filter of the present invention may be used by laminating it to other filter materials, such as dry type nonwoven fabric and porous membrane, depending upon the use purpose.

<Nonwoven Fabric Laminate Structure>

The nonwoven fabric laminate structure of the present invention is a nonwoven fabric laminate structure having the melt-blown nonwoven fabric on at least one surface of which a spun bonded nonwoven fabric is laminated, and the ratio of a basis weight (g/m²) of the melt-blown nonwoven fabric layer to a basis weight (g/m²) of the whole laminate is not more than 0.050, preferably not more than 0.040.

A nonwoven fabric having a basis weight ratio of more than 0.050 is liable to have poor flexibility and poor air permeability because the basis weight of the melt-blown nonwoven fabric is high.

<Separator>

The battery separator of the present invention is a separator containing a layer composed of the melt-blown nonwoven fabric, and is desired to have a mean fiber diameter of 0.1 to 2.0 μm, preferably 0.2 to 1.5 μm, more preferably 0.3 to 1.0 μm, and a basis weight of 3 to 30 g/m², preferably 4 to 25 g/m², more preferably 5 to 15 g/m². A mean fiber diameter of such a range is preferable because a nonwoven fabric having extremely fine pores can be produced, and fiber formation by the melt-blowing process and production of a nonwoven fabric are smoothly carried out with high productivity. A basis weight of this range is preferable because when the separator is used for a battery, the battery is free from short circuit and has low internal resistance.

In the lithium ion battery separators of the present invention, a separator obtained by press forming of such a melt-blown nonwoven fabric is included. The means for the press forming used for producing the lithium ion battery separator of the present invention is not specifically restricted, and any press forming means capable of applying a pressure in the thickness direction of the melt-blown nonwoven fabric can be used. However, a press forming means in which a part coming into contact with at least one surface of the melt-blown nonwoven fabric during pressing is formed from a material having elasticity and having a high coefficient of friction is preferably used. In such a press forming means, the elastic modulus of the contact part having elasticity is preferably 20 to 600 kg/cm², more preferably 20 to 300 kg/cm². Examples of the materials having elasticity and having a high coefficient of friction include paper, cotton, wood, rubber and foamed plastic. Examples of the rubbers among them include urethane rubber, styrene/butadiene rubber, olefin-based elastomer, thermoplastic elastomer and silicon rubber.

Specific examples of the press forming methods include a method in which the melt-blown nonwoven fabric is pressed using a pressing machine with a pressing surface having elasticity that is made of a rubber or the like and a pressing surface made of a metal such as stainless steel, a method in which the melt-blown nonwoven fabric is calendered by calender rolls including a roll having elasticity that is made of a rubber or the like and a rigid roll made of a metal or the like or including a pair of elastic rolls, and a method in which the melt-blown nonwoven fabric is interposed between rubber sheets or the like and then pressed or rolled.

When one pressing part coming into contact with one surface of the melt-blown nonwoven fabric is formed from a material having elasticity and having a high coefficient of friction and the other is formed from a rigid material, it is preferable that the thermal conductivity of the pressing part formed from a material having elasticity is low and the thermal conductivity of the pressing part composed of a rigid material is high. Examples of such rigid materials include metals such as stainless steel. It is industrially advantageous to carry out the press forming for producing the battery separator of the present invention by the use of calender rolls including a roll formed from a material having elasticity and a roll formed from a rigid material, because the process is simple and a battery separator in the form of a long sheet is easily obtained. In order to improve releasability from rolls, it is preferable to subject the surface of the rigid roll to Teflon (registered trademark) processing.

The press forming is preferably carried out while heating, and can be carried out by selecting temperature conditions and pressure conditions under which the fibers to constitute the melt-blown nonwoven fabric are at least partially fusion-bonded to obtain a nonwoven fabric sheet having a desired pore diameter. It is enough just to properly select the pressure/temperature conditions in the press forming process based on the knowledge of a person skilled in the art according to the material of the surface of the pressing means such as a roll, and for example, the conditions can be selected so that the pressing part coming into contact with at least one surface of the melt-blown nonwoven fabric may have a temperature of about 80 to 230° C., preferably about 150 to 200° C. When a pressing means in which a pressing part coming into contact with one surface of the melt-blown nonwoven fabric is formed from a metal and a pressing part coming into contact with the other surface is formed from a rubber is used, the temperature of the metal pressing part can be set to about 120 to 200° C., and the temperature of the rubber pressing part can be set to about 90 to 170° C. When the pressing is carried out with rolls, the surface temperatures of the rolls have only to be in this range.

In the case where the temperature and the pressure in the press forming process are too high, the fibers are excessively fusion-bonded to one another to make the pores of the nonwoven fabric clogged, so that such a case is undesirable. Further, the resulting battery separator cannot be used in some cases because the internal resistance is extremely increased. In the case where the temperature and the pressure are too low, extremely fine pores are not sufficiently formed, and the resulting separator has low extension resistance and poor strength, so that such a case is undesirable. The mean fiber diameter and the basis weight of the nonwoven fabric before the press forming and those after the press forming are almost the same as each other. The void ratio of the lithium ion battery separator of the present invention is not less than 30%, preferably not less than 40%. Although the thickness thereof is not specifically restricted, it is usually 10 to 60 μm, preferably about 15 to 45 μm. When the void ratio is in the above range, the battery separator has low internal resistance, and there is no fear of short circuit caused by passing of an electrode material, so that such a void ratio is preferable. When the thickness is in the above range, this separator can be used also as a small-sized battery separator.

EXAMPLES

The present invention is further described with reference to the following examples, but it should be construed that the present invention is in no way limited to those examples.

Property values, etc. in the examples and the comparative examples were measured by the following methods.

(1) Mean Fiber Diameter (μm), Number of Fusion-Bonded Fibers (Fusion-Bonded Fibers/100 Fibers)

The magnification of an electron microscope (HITACHI S-3500N) was adjusted so that the number of fibers of a melt-blown nonwoven fabric observed on the screen might be in the range of 10 to 20, and a surface microphotograph was taken by the electron microscope. The widths (diameters) of all the fibers having a length of 10 times or more the diameter, observed on the screen, were measured. This measurement was repeated so that the total number of the measured fibers might become 100, and a mean of the results of the diameter measurements was taken as a mean fiber diameter. When the total number of the measured fibers exceeded 100, a mean fiber diameter was calculated from the following formula.

Mean fiber diameter=total of diameter measurement results×100/total number of measured fibers The ratio (Dd/Da) of the standard deviation (Dd) of the measurement results to the mean fiber diameter (Da) was taken as a fiber diameter CV value.

Of the above 100 fibers, a fiber having a fiber diameter of twice the mean fiber diameter was judged to be a fusion-bonded fiber, and the number of such fibers was taken as the number of fusion-bonded fibers.

When the total number of measured fibers exceeded 100, the number of fusion-bonded fibers was calculated from the following formula.

Number of fusion-bonded fibers=total number of fusion-bonded fibers×100/total number of measured fibers (2) Maximum pore diameter (μm), minimum pore diameter (μm) and mean pore diameter (μm) measured in the case of basis weight of 90 g/m²

A melt-blown nonwoven fabric having a basis weight of 90 g/m² was prepared, and a specimen obtained from a nonwoven fabric laminate structure becoming a filter material for water treatment in a constant temperature room having a temperature of 20±2° C. and a humidity of 65±2% defined by JIS Z8703 (standard condition in the test place) was immersed in a fluorine-based inert liquid (manufactured by Sumitomo 3M Limited, trade name: Fluorinert). Using a capillary flow porometer "Model: CFP-1200AE" manufactured by Porous Materials, Inc., a maximum pore diameter (μm), a minimum pore diameter (μm) and a mean pore diameter (μm) in the case of a basis weight of 90 g/m² (shown as "maximum pore diameter", "minimum pore diameter" and "mean pore diameter", respectively, in the tables) were measured.

(3) Inhibition Ratio (%) and Flow Rate (l/Min)

A melt-blown nonwoven fabric having a basis weight of 90 g/m² was prepared. Using a test liquid obtained by dispersing polystyrene latex particles having a spherical particle diameter of 1.00 μm in a 60 vol % isopropyl alcohol (IPA) aqueous solution in a concentration of 0.01% by weight, a filtrate having passed through the melt-blown nonwoven fabric (filter for liquids) under a pressure of 3.0 MPa in a filtration device (ADVANTEC TSU-90B) was obtained, and a concentration $C_1$ of the filtrate and a concentration $C_0$ of the original test liquid were measured. Then, an inhibition ratio was determined by the following formula.

The concentrations of the test liquid and the filtrate were each determined from a calibration curve having been obtained in advance by measuring absorbance at a wavelength of 500 nm by the use of a spectophotometer (SHIMADZU UV3100).

Inhibition ratio=$[(C_0-C_1)/C_0] \times 100(\%)$

Further, using polystyrene latex particles having a spherical particle diameter of 3.00 μm and those having a spherical particle diameter of 0.47 μm, the inhibition ratios were determined by the above method.

The flow rate (l/min) was determined by measuring time necessary for a 60 vol % IPA aqueous solution of 500 cc to pass through the melt-blown nonwoven fabric (filter for liquids) under a pressure of 0.3 MPa in the above filtration device.

(4) Water Pressure Resistance (mm Aqua)

10 Specimens (each 15×15 cm) obtained from a nonwoven fabric laminate structure becoming a filter material for water treatment in a constant temperature room having a temperature of 20±2° C. and a humidity of 65±2% defined by JIS Z8703 (standard condition in the test place) were prepared. Using a water pressure resistance testing machine, pressures at which water leaked from the specimens were measured in accordance with JIS L1092A, and a mean value thereof was determined.

(5) α Crystal Fraction of Propylene-Based Polymer Fiber

A wide angle X-ray diffraction apparatus (RIGAKU RINT2500, attachment: rotary sample table, X-ray source: CuKα, output: 50 kV 300 mA, detector: scintillation counter) was used. A sample holder was filled with a nonwoven fabric, and with rotating the sample, a diffraction profile was measured by a wide angle transmission X-ray diffraction method.

From the diffraction profile result obtained by the measurement, the peak intensity in the vicinity of 2θ=14° showing (110) plane of a propylene-based polymer was regarded as a peak intensity of α crystal, and the peak intensity in the vicinity of 2θ=15° was regarded as a peak intensity of smectic crystal, and the α crystal fraction was determined by the following formula. In the case where a peak in the vicinity of 2θ=15° was not confirmed, it was judged that the propylene-based polymer was constituted of only a crystal, and the α crystal fraction was taken as 1.0.

[αcrystal fraction]=[peak intensity of α crystal]/[peak intensity of α crystal+peak intensity of smectic crystal]

(6) Evaluation of Flexibility

Evaluation of touch was carried out by 10 evaluators. The evaluation results based on the following criteria are shown.

AA: Of the 10 evaluators, 10 evaluators felt that the specimen was smooth to the touch.

BB: Of the 10 evaluators, 9 to 7 evaluators felt that the specimen was smooth to the touch.

CC: Of the 10 evaluators, 6 to 3 evaluators felt that the specimen was smooth to the touch.

DD: Of the 10 evaluators, 2 or less evaluators felt that the specimen was smooth to the touch.

Example 1

Production of Spun Bonded Nonwoven Fabric

Using a spun bonded nonwoven fabric production apparatus (the length of the collection surface in the direction perpendicular to the machine direction: 500 mm), a propylene homopolymer (PP-1, MFR: 60 g/10 min, melting point: 157° C.) was melted at 240° C. to prepare a spun bonded nonwoven fabric having a basis weight of 7 g/m² and a fiber diameter of 14 μm.

<Production of Nonwoven Fabric Laminate Structure>

A propylene homopolymer (PP-2, MFR: 850 g/10 min, melting point: 159° C.) was fed to a die of a melt-blown nonwoven fabric production apparatus, and onto one surface of the spun bonded nonwoven fabric obtained by the above method, the homopolymer melt was discharged from the die having a preset temperature of 280° C. through a melt-blowing nozzle (diameter: 0.32 mm, distance between small holes of nozzle: 0.20 mm) at a discharge rate of 0.52 g/min per nozzle single hole while gushing out high-temperature high-velocity air (280° C., 600 m³/hr) from both sides of the nozzle. Thereafter, cooling and dispersing were carried out by means of cooling air (temperature: 15° C., air flow rate: 6000 m³/hr) to blow the fibers against the spun bonded nonwoven fabric at DCD (distance between the surface of spinneret and the collector) of 120 mm so that the basis weight of the resulting melt-blown nonwoven fabric might become 0.7 g/m², whereby a laminate of the spun bonded nonwoven fabric and a melt-blown nonwoven fabric was obtained. Subsequently, on the melt-blown nonwoven fabric of the laminate structure, a spun bonded nonwoven fabric produced under the same conditions as above was laminated, to obtain a nonwoven fabric laminate structure having a total basis weight of 14.7 g/m² (spun bonded nonwoven fabric/melt-blown nonwoven fabric/spun bonded nonwoven fabric=7.0/0.7/7.0 g/m²).

Properties of the resulting nonwoven fabric laminate structure were measured by the methods previously described. The results are set forth in Table 1.

Example 2

A nonwoven fabric laminate structure having a total basis weight of 14.5 g/m² (spun bonded nonwoven fabric/melt-blown nonwoven fabric/spun bonded nonwoven fabric=7.0/0.5/7.0 g/m²) was obtained in the same manner as in Example 1, except that a melt-blown nonwoven fabric having a basis weight of 0.5 g/m², which had been produced by the use of a melt-blowing nozzle (diameter: 0.32 mm, distance between small holes of nozzle: 1.59 mm) at a discharge rate of 1.27 g/min per nozzle single hole, was used as a melt-blown nonwoven fabric to be laminated on the spun bonded nonwoven fabric instead of the melt-blown nonwoven fabric produced in Example 1.

Properties of the resulting nonwoven fabric laminate structure were measured by the methods previously described. The results are set forth in Table 1.

Example 3

A propylene homopolymer (MFR: 1500 g/10 min) was fed to a die of a melt-blown nonwoven fabric production apparatus, and the homopolymer melt was discharged from the die having a preset temperature of 280° C. through a melt-blowing nozzle (diameter: 0.2 mm, distance between small holes of nozzle: 2.62 mm) at a discharge rate of 0.08 g/min per nozzle single hole while gushing out high-temperature high-velocity air (280° C., 600 m³/hr) from both sides of the nozzle. Thereafter, cooling and dispersing were carried out by means of cooling air (temperature: 15° C., air flow rate: 6000 m³/hr) to blow the fibers against a collector at DCD (distance between the surface of spinneret and the collector) of 120 mm, whereby a melt-blown nonwoven fabric having a basis weight of 15 g/m² was obtained.

Subsequently, 6 of the resulting melt-blown nonwoven fabrics were superposed upon one another to prepare a filter for liquids having a basis weight of 90 g/m². The results are set forth in Table 2.

Example 4

A nonwoven fabric laminate structure having a total basis weight of 13.0 g/m² (spun bonded nonwoven fabric/melt-blown nonwoven fabric/spun bonded nonwoven fabric=6.15/0.7/6.15 g/m²) was obtained in the same manner as in Example 1, except that a melt-blown nonwoven fabric having a basis weight of 0.7 g/m², which had been produced by the use of a melt-blowing nozzle (diameter: 0.32 mm, distance between small holes of nozzle: 1.02 mm) at a discharge rate of 1.26 g/min per nozzle single hole, was used as a melt-blown nonwoven fabric to be laminated on the spun bonded nonwoven fabric instead of the melt-blown nonwoven fabric produced in Example 1, the flow rate of the high-temperature high-velocity air was changed to 1400 m³/hr, and the DCD was changed to 150 mm.

Properties of the resulting nonwoven fabric laminate structure were measured by the methods previously described. The results are set forth in Table 1.

Example 5

A nonwoven fabric laminate structure having a total basis weight of 13.0 g/m² (spun bonded nonwoven fabric/melt-blown nonwoven fabric/spun bonded nonwoven fabric=6.15/0.7/6.15 g/m²) was obtained in the same manner as in Example 4, except that a melt-blown nonwoven fabric having a basis weight of 0.7 g/m², which had been produced by the use of a melt-blowing nozzle (diameter: 0.32 mm, distance between small holes of nozzle: 0.33 mm) at a discharge rate of 0.63 g/min per nozzle single hole, was used as a melt-blown nonwoven fabric to be laminated on the spun bonded nonwoven fabric, and the flow rate of the high-temperature high-velocity air was changed to 1500 m³/hr.

Properties of the resulting nonwoven fabric laminate structure were measured by the methods previously described. The results are set forth in Table 1.

Example 6

A nonwoven fabric laminate structure having a total basis weight of 13.0 g/m² (spun bonded nonwoven fabric/melt-blown nonwoven fabric/spun bonded nonwoven fabric=6.15/0.7/6.15 g/m²) was obtained in the same manner as in Example 4, except that a melt-blown nonwoven fabric having a basis weight of 0.7 g/m², which had been produced by the use of a melt-blowing nozzle (diameter: 0.32 mm, distance between small holes of nozzle: 0.20 mm) at a discharge rate of 0.51 g/min per nozzle single hole, was used as a melt-blown nonwoven fabric to be laminated on the spun bonded nonwoven fabric, and the flow rate of the high-temperature high-velocity air was changed to 700 m³/hr.

Properties of the resulting nonwoven fabric laminate structure were measured by the methods previously described. The results are set forth in Table 1.

Example 7

A nonwoven fabric laminate structure having a total basis weight of 13.0 g/m² (spun bonded nonwoven fabric/melt-blown nonwoven fabric/spun bonded nonwoven fabric=6.15/0.7/6.15 g/m²) was obtained in the same manner as in Example 4, except that a melt-blown nonwoven fabric having a basis weight of 0.7 g/m², which had been produced by the use of a melt-blowing nozzle (diameter: 0.4 mm, distance between small holes of nozzle: 0.25 mm) at a discharge rate of 0.51 g/min per nozzle single hole, was used as a melt-blown nonwoven fabric to be laminated on the spun bonded nonwoven fabric, and the flow rate of the high-temperature high-velocity air was changed to 1200 m³/hr.

Properties of the resulting nonwoven fabric laminate structure were measured by the methods previously described. The results are set forth in Table 1.

Comparative Example 1

A nonwoven fabric laminate structure having a total basis weight of 15.0 g/m² (spun bonded nonwoven fabric/melt-blown nonwoven fabric/spun bonded nonwoven fabric=7.0/1.0/7.0 g/m²) was obtained in the same manner as in Example 1, except that cooling air was not used in the production of a melt-blown nonwoven fabric, and a melt-blown nonwoven fabric having a basis weight of 1.0 g/m² was used.

Properties of the resulting nonwoven fabric laminate structure were measured by the methods previously described. The results are set forth in Table 1.

Comparative Example 2

A melt-blown nonwoven fabric having a basis weight of 15 g/m² was obtained in the same manner as in Example 3, except that cooling air was not used in the production of a melt-blown nonwoven fabric.

Subsequently, 6 of the resulting melt-blown nonwoven fabrics were superposed upon one another to prepare a filter for liquids having a basis weight of 90 g/m². The results are set forth in Table 2.

Comparative Example 3

A melt-blown nonwoven fabric having a basis weight of 15 g/m² was obtained in the same manner as in Comparative Example 2, except that a melt-blowing nozzle (diameter: 0.2 mm, distance between small holes of nozzle: 0.68 mm) was used.

Subsequently, 6 of the resulting melt-blown nonwoven fabrics were superposed upon one another to prepare a filter for liquids having a basis weight of 90 g/m². The results are set forth in Table 2.

Comparative Example 4

A melt-blown nonwoven fabric having a basis weight of 15 g/m² was obtained in the same manner as in Comparative Example 2, except that a melt-blowing nozzle (diameter: 0.2 mm, distance between small holes of nozzle: 2.62 mm) was used.

Subsequently, 6 of the resulting melt-blown nonwoven fabrics were superposed upon one another to prepare a filter for liquids having a basis weight of 90 g/m². The results are set forth in Table 2.

Comparative Example 5

A nonwoven fabric laminate structure having a total basis weight of 14.7 g/m² (spun bonded nonwoven fabric/melt-blown nonwoven fabric/spun bonded nonwoven fabric=7.0/0.7/7.0 g/m²) was obtained in the same manner as in Comparative Example 1, except that a melt-blown nonwoven fabric having a basis weight of 0.7 g/m² was used.

Properties of the resulting nonwoven fabric laminate structure were measured by the methods previously described. The results are set forth in Table 1.

Comparative Example 6

A nonwoven fabric laminate structure having a total basis weight of 14.7 g/m² (spun bonded nonwoven fabric/melt-blown nonwoven fabric/spun bonded nonwoven fabric=7.0/0.7/7.0 g/m²) was obtained in the same manner as in Example 1, except that in the production of a melt-blown nonwoven fabric, air having a temperature of 50° C. and an air flow rate of 6000 m³/hr was used instead of cooling air, and the DCD was changed to 150 mm.

Properties of the resulting nonwoven fabric laminate structure were measured by the methods previously described. The results are set forth in Table 1.

Comparative Example 7

A nonwoven fabric laminate structure having a total basis weight of 13.0 g/m² (spun bonded nonwoven fabric/melt-blown nonwoven fabric/spun bonded nonwoven fabric=6.15/0.7/6.15 g/m²) was obtained in the same manner as in Example 5, except that in the production of a melt-blown nonwoven fabric, cooling air was not used, and the flow rate of the high-temperature high-velocity air was changed to 1000 m³/hr.

Properties of the resulting nonwoven fabric laminate structure were measured by the methods previously described. The results are set forth in Table 1.

TABLE 1

|  |  | Ex. 1 | Ex. 2 | Ex. 4 | Ex. 5 | Ex. 6 | Ex. 7 |
|---|---|---|---|---|---|---|---|
| Apparatus | Distance between small holes d (mm) | 0.20 | 1.59 | 1.02 | 0.33 | 0.20 | 0.25 |
|  | Nozzle diameter Ø (mm) | 0.32 | 0.32 | 0.32 | 0.32 | 0.32 | 0.4 |
| Melt-blown nonwoven fabric discharge rate | (g/min/hole) | 0.52 | 1.27 | 1.26 | 0.63 | 0.51 | 0.51 |
|  | (kg/hr/m) | 61 | 43 | 60 | 60 | 60 | 48 |
| Nonwoven fabric constitution | Total basis weight (g/m$^2$) | 14.7 | 14.5 | 13.0 | 13.0 | 13.0 | 13.0 |
|  | MB basis weight (g/m$^2$) | 0.70 | 0.50 | 0.70 | 0.70 | 0.70 | 0.70 |
|  | Form | laminate | laminate | laminate | laminate | laminate | laminate |
| Cooling air | Temperature (° C.) | 15 | 15 | 15 | 15 | 15 | 15 |
|  | Air flow rate (m$^3$/hr) | 6000 | 6000 | 6000 | 6000 | 6000 | 6000 |
| High-temperature high-velocity air | Temperature (° C.) | 280 | 280 | 280 | 280 | 280 | 280 |
|  | Flow rate (m$^3$/hr) | 600 | 600 | 1400 | 1500 | 700 | 1200 |
| DCD (mm) |  | 120 | 120 | 150 | 150 | 150 | 150 |
| Fiber diameter | Mean (μm) | 1.5 | 1.2 | 1.9 | 1.9 | 1.9 | 2.0 |
|  | CV value (%) | 33 | 30 | 53 | 42 | 55 | 58 |
| Number of fusion-bonded fibers (fusion-bonded fibers/100 fibers) |  | 10 | 5 | 5 | 3 | 10 | 10 |
| Crystalline property | α crystal fraction | 0.42 | 0.47 | 0.42 | 0.42 | 0.42 | 0.42 |
| Water pressure resistance (mmAqua) |  | 185 | 193 | 192 | 198 | 170 | 168 |
| Flexibility |  | BB | BB | BB | BB | BB | BB |
| Filter performance | Inhibition ratio (%) | — | — | — | — | — | — |

|  |  | Comp. Ex. 1 | Comp. Ex. 5 | Comp. Ex. 6 | Comp. Ex. 7 |
|---|---|---|---|---|---|
| Apparatus | Distance between small holes d (mm) | 0.20 | 0.32 | 0.20 | 0.33 |
|  | Nozzle diameter Ø (mm) | 0.32 | 0.32 | 0.32 | 0.32 |
| Melt-blown nonwoven fabric discharge rate | (g/min/hole) | 0.52 | 0.52 | 0.52 | 0.63 |
|  | (kg/hr/m) | 61 | 61 | 61 | 60 |
| Nonwoven fabric constitution | Total basis weight (g/m$^2$) | 15.0 | 14.7 | 14.7 | 13.0 |
|  | MB basis weight (g/m$^2$) | 1.00 | 0.70 | 0.70 | 0.70 |
|  | Form | laminate | laminate | laminate | laminate |
| Cooling air | Temperature (° C.) | — | — | 50 | — |
|  | Air flow rate (m$^3$/hr) | — | — | 6000 | — |
| High-temperature high-velocity air | Temperature (° C.) | 280 | 280 | 280 | 280 |
|  | Flow rate (m$^3$/hr) | 600 | 600 | 600 | 1000 |
| DCD (mm) |  | 120 | 120 | 150 | 150 |
| Fiber diameter | Mean (μm) | 3.0 | 3.0 | 2.8 | 2.2 |
|  | CV value (%) | 84 | 84 | 112 | 63 |
| Number of fusion-bonded fibers (fusion-bonded fibers/100 fibers) |  | 23 | 23 | 29 | 17 |
| Crystalline property | α crystal fraction | 1.00 | 1.00 | 1.00 | 1.00 |
| Water pressure resistance (mmAqua) |  | 180 | 135 | 120 | 172 |
| Flexibility |  | CC | CC | CC | CC |
| Filter performance | Inhibition ratio (%) | — | — | — | — |

TABLE 2

|  |  | Ex. 3 | Comp. Ex. 2 | Comp. Ex. 3 | Comp. Ex. 4 |
|---|---|---|---|---|---|
| Apparatus | Distance between small holes d (mm) | 2.62 | 0.20 | 0.68 | 2.62 |
|  | Nozzle diameter Ø (mm) | 0.2 | 0.32 | 0.2 | 0.2 |
| Melt-blown nonwoven fabric discharge rate | (g/min/hole) | 0.08 | 0.08 | 0.08 | 0.08 |
|  | (kg/hr/m) | 2 | 9 | 6 | 2 |
| Nonwoven fabric constitution | Total basis weight (g/m$^2$) | 90 | 90 | 90 | 90 |
|  | MB basis weight (g/m$^2$) | 90.00 | 90.00 | 90.00 | 90.00 |
|  | Form | single layer | single layer | single layer | single layer |
| Cooling air | Temperature (° C.) | 15 | — | — | — |
|  | Air flow rate (m$^3$/hr) | 6000 | — | — | — |
| High-temperature high-velocity air | Temperature (° C.) | 280 | 280 | 280 | 280 |
|  | Flow rate (m$^3$/hr) | 600 | 600 | 600 | 600 |
| DCD (mm) |  | 120 | 120 | 120 | 120 |
| Fiber diameter | Mean (μm) | 0.5 | 1.8 | 0.8 | 0.6 |
|  | CV value (%) | 50 | 80 | 120 | 60 |
| Number of fusion-bonded fibers (fusion-bonded fibers/100 fibers) |  | 8 | 21 | 33 | 16 |

TABLE 2-continued

|  |  | Ex. 3 | Comp. Ex. 2 | Comp. Ex. 3 | Comp. Ex. 4 |
|---|---|---|---|---|---|
| Crystalline property | α crystal fraction | 0.44 | 0.95 | 1.00 | 1.00 |
| Water pressure resistance (mmAqua) | | — | — | — | — |
| Filter performance | Inhibition ratio (%) | 99.5 | 18.0 | 64.0 | 85.0 |

INDUSTRIAL APPLICABILITY

The present invention can provide a process for stably producing a melt-blown nonwoven fabric comprising thin fibers and having extremely few thick fibers formed by fusion bonding of fibers to one another, a production apparatus for the melt-blown nonwoven fabric, and the melt-blown nonwoven fabric.

In the melt-blown nonwoven fabric of the present invention, cooling of the spun molten fibers is sufficiently effected, and therefore, bundle-like fibers formed by fusion bonding or twisting of plural fibers are extremely few. On this account, the melt-blown nonwoven fabric has features that voids in the nonwoven fabric are remarkably uniform and the efficiency of collection of fine particles is extremely high, so that the melt-blown nonwoven fabric can be favorably used as a filter.

Further, since the melt-blown nonwoven fabric of the present invention has extremely high water resistance, it can exhibit the same performance as that of conventional nonwoven fabrics even if the basis weight is lower than that of the conventional nonwoven fabrics. In addition, the melt-blown nonwoven fabric of the present invention has excellent flexibility. On this account, the melt-blown nonwoven fabric is favorably used for sanitary materials, such as paper diapers and sanitary napkins, and moreover, because of flexibility and good feeling, it can be widely used for medical purposes, operating gowns, packaging cloths, bedclothes such as bed sheets and pillowcases, carpets, base fabrics for artificial leathers, industrial materials, civil engineering materials, agricultural and gardening materials, materials relevant to living, etc.

REFERENCE SIGNS LIST

2: production apparatus
4: melt-blowing die
6: mesh conveyer
8: suction box
10: fiber
12: die nose
14: small hole
16: nozzle
18: resin passage
20a, 20b: air passage
31: slit
32: attachment

The invention claimed is:

1. A melt-blown nonwoven fabric comprising polyolefin fibers and having:
   (i) a mean fiber diameter of not more than 2.0 μm,
   (ii) a fiber diameter distribution CV value of not more than 60%, and
   (iii) 15 or less fusion-bonded fibers based on 100 fibers.

2. A melt-blown nonwoven fabric comprising propylene-based polymer fibers and having:
   (i) a mean fiber diameter of not more than 2.0 μm,
   (ii) a fiber diameter distribution CV value of not more than 60%, and
   (iii) an α crystal fraction of less than 0.9.

3. A filter containing a layer composed of the melt-blown nonwoven fabric as claimed in claim 1 and having a 0.5 mm diameter fine particle collection efficiency of not less than 90% in the case of a basis weight of 90 g/cm$^2$.

4. A nonwoven fabric laminate structure having the melt-blown nonwoven fabric as claimed in claim 1 on at least one surface of which a spun bonded nonwoven fabric is laminated, wherein a ratio of a basis weight (g/m$^2$) of the melt-blown nonwoven fabric layer to a basis weight (g/m$^2$) of the whole laminate is not more than 0.05.

5. Sanitary goods comprising the nonwoven fabric laminate structure as claimed in claim 4.

6. A battery separator containing a layer composed of the melt-blown nonwoven fabric as claimed in claim 1.

7. A filter containing a layer composed of the melt-blown nonwoven fabric as claimed in claim 2 and having a 0.5 mm diameter fine particle collection efficiency of not less than 90% in the case of a basis weight of 90 g/cm$^2$.

8. A nonwoven fabric laminate structure having the melt-blown nonwoven fabric as claimed in claim 2 on at least one surface of which a spun bonded nonwoven fabric is laminated, wherein a ratio of a basis weight (g/m$^2$) of the melt-blown nonwoven fabric layer to a basis weight (g/m$^2$) of the whole laminate is not more than 0.05.

9. Sanitary goods comprising the nonwoven fabric laminate structure as claimed in claim 8.

10. A battery separator containing a layer composed of the melt-blown nonwoven fabric as claimed in claim 2.

* * * * *